Dec. 9, 1947.  T. S. GRIMES  2,432,235
COTTON SCREEN
Filed Nov. 17, 1944  4 Sheets-Sheet 1

T. S. GRIMES
INVENTOR.

BY
Henry L. Jennings
ATTORNEY

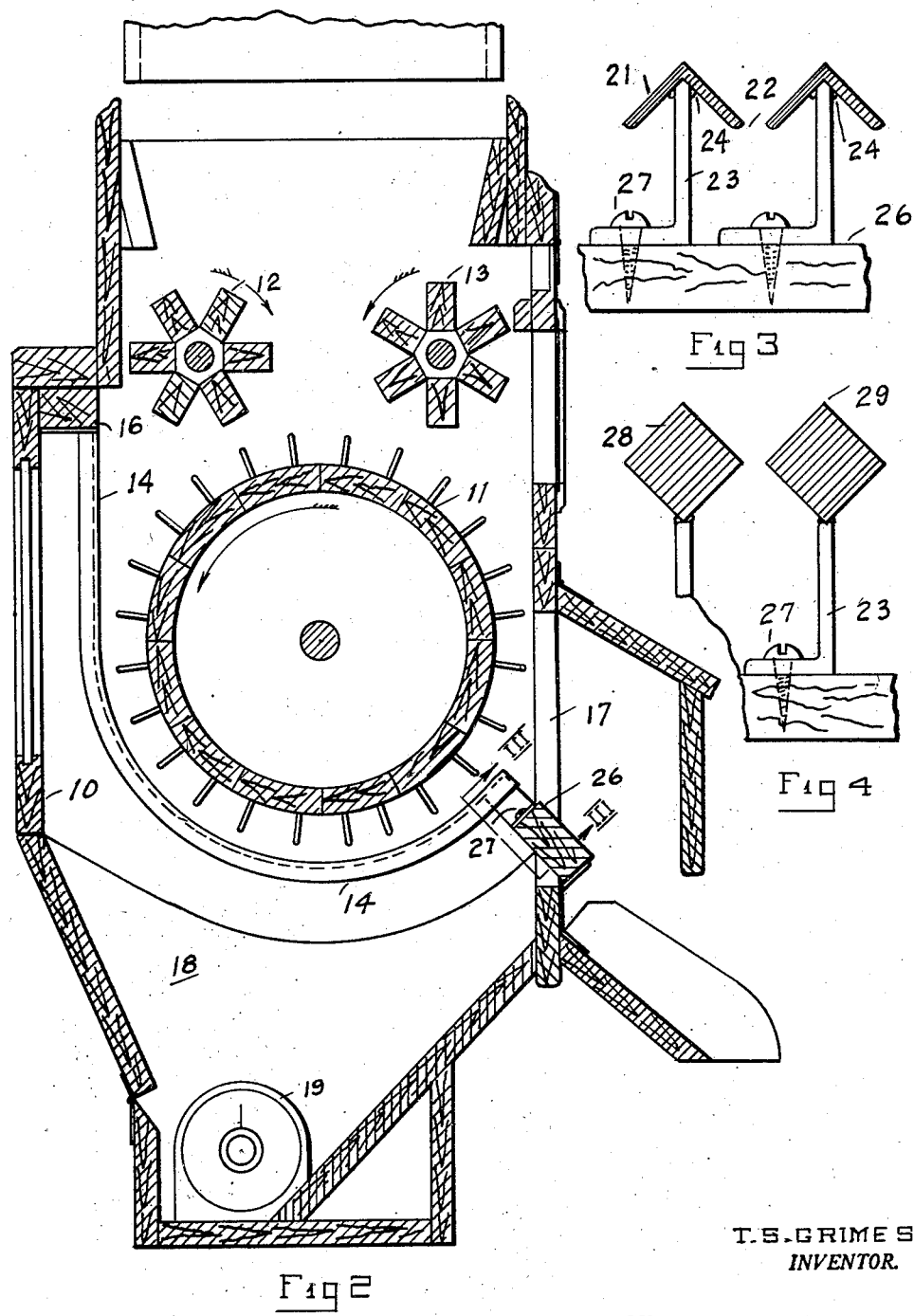

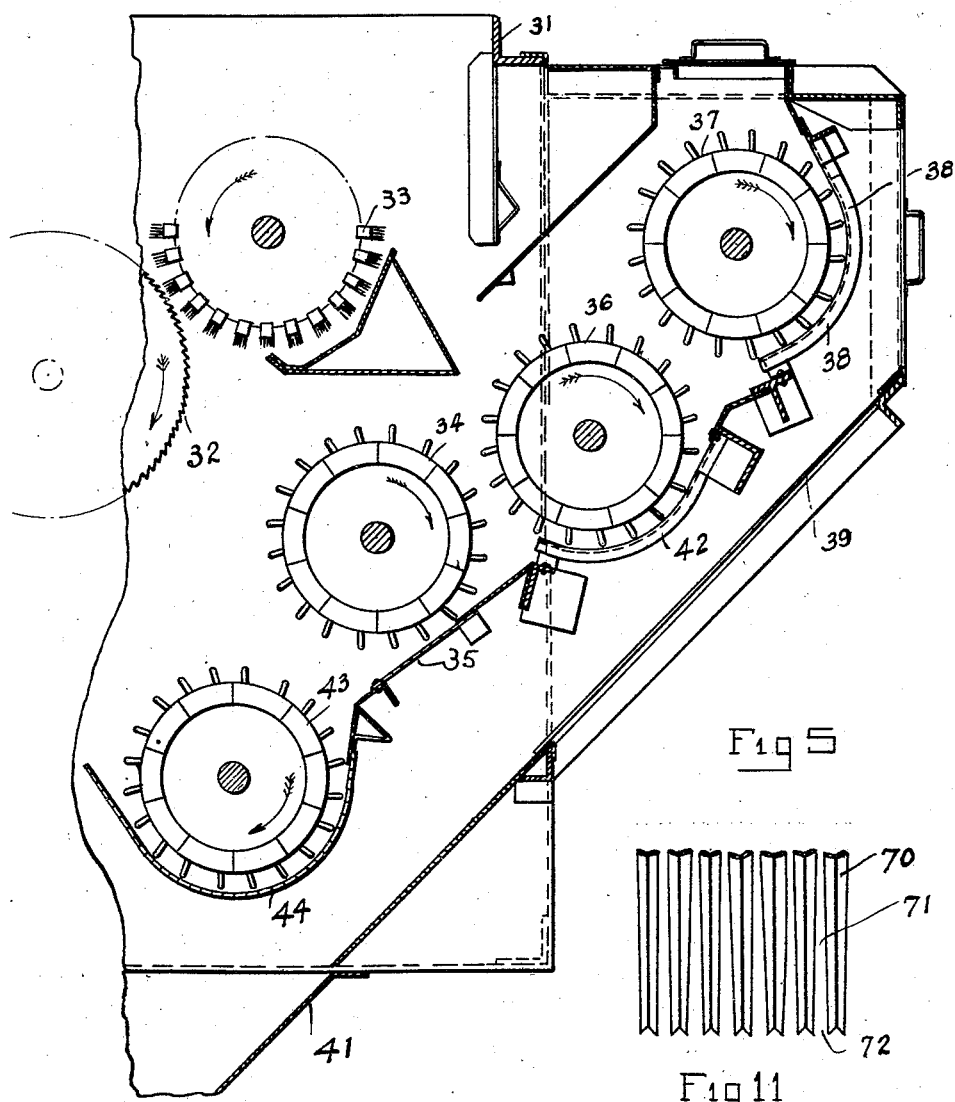

Dec. 9, 1947.     T. S. GRIMES     2,432,235
COTTON SCREEN
Filed Nov. 17, 1944     4 Sheets-Sheet 4
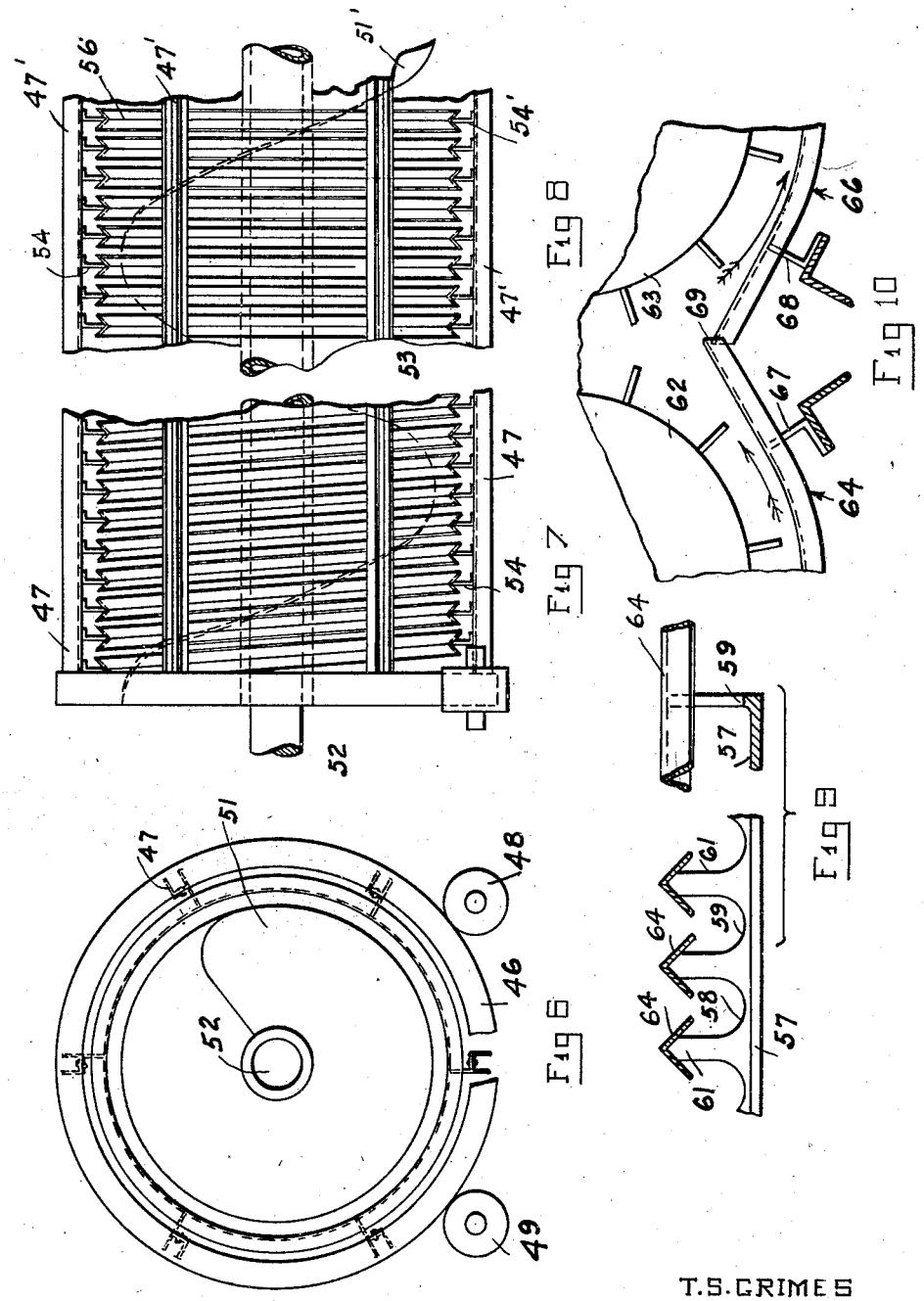
T. S. GRIMES
*INVENTOR.*
BY *Henry L. Jennings*
ATTORNEY Patented Dec. 9, 1947

2,432,235

UNITED STATES PATENT OFFICE 2,432,235

COTTON SCREEN

Thaddeus S. Grimes, Columbus, Ga., assignor to Lummus Cotton Gin Company, a corporation of Georgia Application November 17, 1944, Serial No. 563,923

1 Claim. (Cl. 19—95)

My invention relates to a screen for use in cotton cleaners and the like and has for its object the provision of apparatus of the character designated which shall be simple of construction, easy of installation, and effective to provide a more thorough separation of leafy trash and dirt from the cotton than has been possible with apparatus such as heretofore been employed.

A further object of my invention is to provide a screen for a cotton cleaner which is particularly effective in removing green leaves, sticks and stems from cotton that has been harvested by a mechanical picker or other means as it comes from the field.

As is well known in the art to which my invention relates, cotton cleaners usually embody a moving element in the form of a rotary cylinder having spikes or vanes thereon and which rotates over a mesh screen and drags or pulls the cotton over the screen. The agitation and rubbing of the cotton against the screen causes the dirt, trash, sticks, and other foreign matter, to be expelled through the screen and the cleaned cotton is delivered from the end of the screen. Difficulties have been encountered with all such apparatus in removing green leaves and sticks from seed cotton as it comes from the field. Recently, with the advent of mechanical cotton pickers, the difficulty with green leaves and sticks has been multiplied many times as the mechanical pickers operate by means of spindles extending downwardly through the branches of the cotton stalk, winding the locks of cotton around them. This mechanical action winds up a great amount of green leaves and stems with the cotton. If the green leaves and stems are left in the cotton until they dry and are brittle enough to be removed by cleaners such as heretofore have been employed, they stain the lint, and thus lower the grade and price of the cotton. If the cotton can be carried directly from the field to the gin and the green leaves removed before they dry, there is no damage from stain nor a lowering of grade due to leaf in the lint after it is ginned. It is accordingly a principal object of my invention to provide a screen to be included in a cotton cleaner, which is adapted to separate the green leaves and stems before they become dry and brittle.

In my solution of the problem, I have discovered that if a screen be employed embodying continuous, parallel downwardly converging openings extending preferably in the direction of material movement thereover, and particularly a screen comprising elements presenting relatively sharp edges along which the cotton is drawn, the green leaves and stems are gradually worked to the bottoms of the elongated openings and fall through the screen. I have discovered that the elements of such a screen should not include cross members to impede the flow of material through the screen; also, the delivery end of the screen should be so supported as to provide a free discharge of the cotton from the apparatus; otherwise the cotton banks up or accumulates at the cross members and at the discharge end of the screen and has to be cleaned out periodically for the apparatus to operate.

The screen elements may be in the form of structural steel angle bars disposed in spaced parallel relation to provide continuous elongated openings therebetween. The screen elements may also comprise other shapes, such, for example, as bars which are square or triangular in cross section and which are turned with a corner facing the material moving thereover. The bars may be curved lengthwise to cooperate with the rotary element of a cotton cleaner, or be straight as in a shaking screen. The cotton may be moved over the screen by any suitable means known to the art, for example, by means of a rotary cylinder having spikes or vanes thereon, by rotating a cylindrical screen, by an air current, or by gravity as in the case of an inclined shaking screen.

Apparatus embodying features of my invention is illustrated in the accompanying drawings, forming a part of this application, in which Fig. 1 is a front elevational view of a cleaning feeder, with parts broken away, showing my improved screen installed therein;

Fig. 2 is a vertical sectional view of the same;

Fig. 3 is a sectional view taken along lines III—III of Fig. 2;

Fig. 4 is a view similar to Fig. 3 showing a modified form of screen bar;

Fig. 5 is a fragmentary view of a combined cleaner and hull separator embodying a plurality of my improved screens;

Fig. 6 is an end view of a cylindrical cleaner having my improved screen;

Fig. 7 is a fragmentary side elevational view of the apparatus of Fig. 6;

Fig. 8 is a view similar to Fig. 7 showing a still further modified form;

Fig. 9 is a composite view showing a modified form of support for the screen bars;

Fig. 10 is a fragmentary view showing the manner of mounting two of my improved screens in side by side relation to deliver cotton from one to the other; and Fig. 11 is a fragmentary plan view of a still further modified form of my improved screen.

Figure 1:
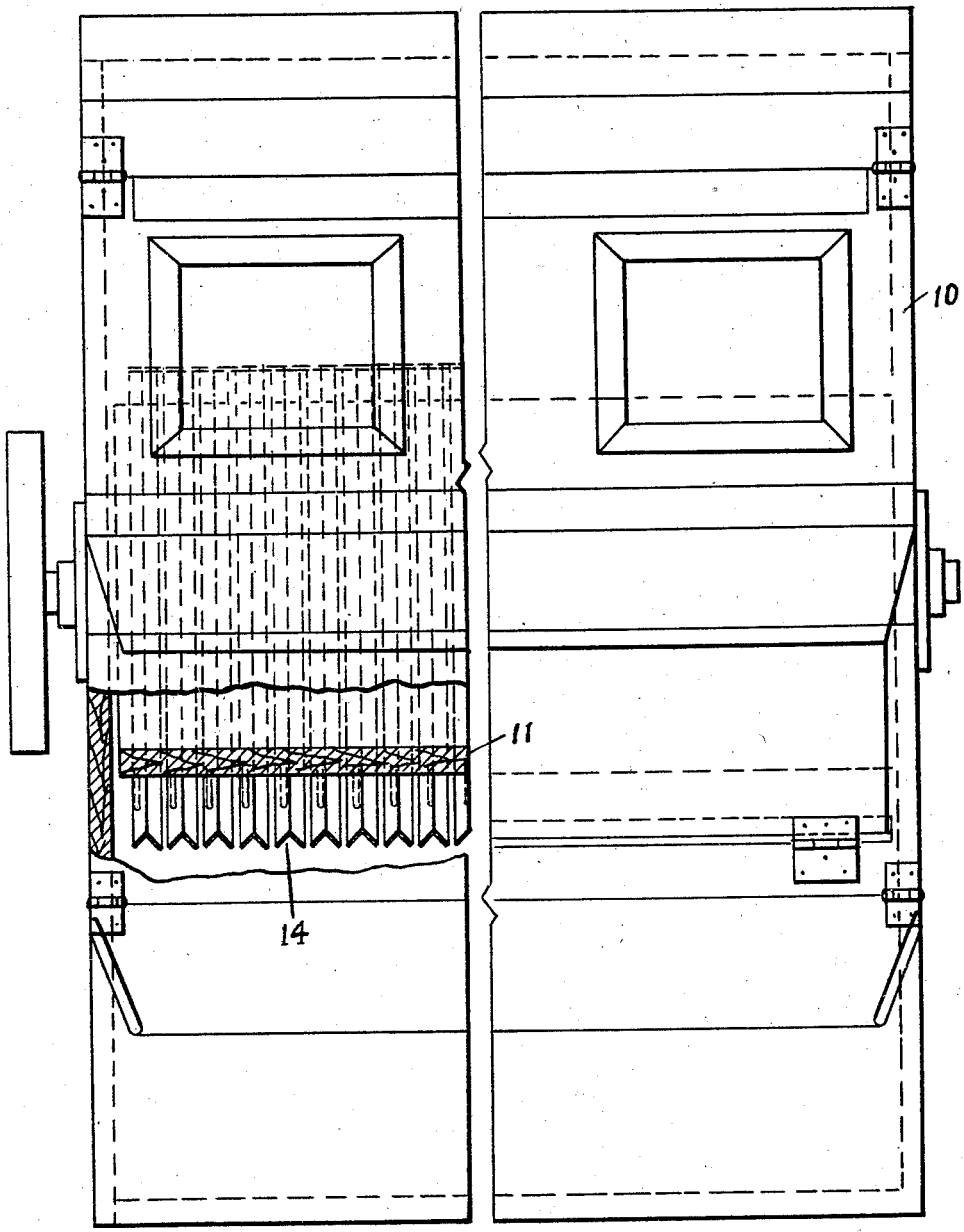

Referring to the drawings for a better understanding of my invention, I show in Figs. 1 and 2 a cleaner-feeder comprising a casing 10 having mounted therein a spiked cylinder 11 and two feed rollers 12 and 13 disposed above the spiked cylinder 11. The rotary cylinder 11 and the feed rollers 12 and 13 are driven in the directions shown by the arrows by any suitable means, not shown. At 14 I show my improved screen which is mounted in spaced relation to the spiked roller 11 and is secured at its upper end to a frame member 16 forming a part of the casing. It terminates at its lower end at a delivery opening 17 through which cleaned cotton is discharged. In the lower part of the casing is a hopper 18 and mounted in the bottom of the hopper 18 is a conveyor 19 for carrying away the trash passing through the screen 14.

As shown in Figs. 1 and 2, my improved screen may comprise structural steel angle bars 21 mounted with their edges toward the spiked roller 11, so as to define downwardly converging openings 22 between them. The bars, or angles 21, as shown in Fig. 1, are mounted in parallel relation so as to provide parallel openings therethrough extending in the direction of movement of cotton thereover.

An important feature of my invention is the method of support of the lower, or discharge ends of the bars 21 which, as shown in Fig. 3, are supported by means of short pieces of angle bars 23 with one flange extending upwardly in the angle formed between the sides of the angle bars 21 and welded thereto at 24. The other leg of each of the angles 23 is secured to a cross piece 26, extending across the discharge opening 17, by means of screws 27. I have found that the sharp edges of the bars 21 which are presented to the cotton being moved thereover plays an important part in separating the green leaves from the cotton. The leaves and stems, as will be seen from Figs. 1 and 3, have a very narrow edge to ride on which is the apex of the angle formed by the sides of the bars 21. This engages the leaves and sticks and separates them from the cotton. The continued rotation of the spiked cylinder 11 forces them down the slopes of the sides of the angles and out of the slots 22 between the bars.

In Fig. 4 I show a modified form of my invention in which I employ bars 28 which are square in cross section and mount them with a corner, or apex 29 of the angle formed by the two sides uppermost, and support them as are supported the angle bars 21, by means of the chairs 23. It will be seen that this form of my invention provides the same character of surface to which the cotton is subjected and the same kind of openings through the screen.

Referring now to Fig. 5 of the drawing, I show a fragment of a well known form of combined cleaner and hull separator, embodying my improved screen. The cleaner separator embodies a casing 31 in which is located a saw cylinder 32 which is employed in separating the hulls from the cotton in a manner well understood in the art. The cotton is doffed from the saw cylinder 32 by means of a rotary brush 33. The cotton doffed by the brush 33 is delivered to a rotary spiked cylinder 34 and from thence to spiked cylinders 36 and 37. The upper cylinder 37 carries the cotton around beneath it and in contact with a screen 38, constructed substantially in accordance with the construction shown in Figs. 1 to 3 of the drawing. Leaves, sticks, and other foreign matter, expelled through the screen 38 fall downwardly therethrough into the casing and pass by gravity down the sloping walls 39 thereof to a hopper bottom 41, as is well understood. Cotton is delivered from the rotary cylinder 37 downwardly to cylinder 36 and over a second screen 42. The screen 42 is also constructed substantially in accordance with the screen shown in Figs. 1 to 3 of the drawing. From the cylinder 36, the cotton passes beneath the cylinder 34 over a perforated screen 35 and is delivered to a spiked cylinder 43. From thence it is carried around beneath the cylinder 43 in contact with a second perforated screen 44 which is particularly adapted for fine trash and sand. After passing beneath the spiked cylinder 43, the cotton passes to a delivery outlet, not shown, as is well understood.

Referring now to Figs. 6 and 7 of the drawings, I show a cotton cleaner embodying end supporting rings 46 (only one being shown) which are joined together by means of longitudinal braces 47. The end rings 46 are mounted for rotation on rollers 48 and 49 so that the frame may be rotated by any suitable source of power, not shown. Mounted within the frame just described is a screw conveyor 51 the flights of which are mounted on a central shaft 52 which may be either stationary or be rotated, as is well understood. Supported from the longitudinal frame members 47 is my improved screen which in this modification comprises a continuous angle member 53 curved to a spiral form and supported from the longitudinal frame members 47 by means of chairs 54. The separate convolutions of the bar 53 are spaced to provide continuous parallel openings of the required spacing. As is well understood, in cleaners of this general type, cotton is fed into one end of the cylindrical screen, and due to the relative rotary movement of the conveyor 51 and the screen, the cotton travels over the screen, generally lengthwise of the screen bars and from one end of the screen to the other, the leaves and trash being discharged from between the screen bars.

In Fig. 8 I show a still further modified form of my invention which includes a cylindrical frame structure similar to that shown in Figs. 6 and 7, embodying longitudinal frame members 47' which support separate screen elements comprising angle bars 56 formed in rings and supported from the frame members 47' by means of chairs 54'. As shown, the angle bars 56 are spaced to provide continuous elongated slots around the cleaner of the required spacing. A screw conveyor 51', similar to the conveyor 51 shown in Figs. 6 and 7, serves to move the cotton on the screen generally lengthwise of the bars and to effect longitudinal movement of the cotton through the cleaner.

Referring now to Fig. 9, I show a modified form of support for the screen bars, such as the angle bars 54 shown in Fig. 7. In accordance with this modification, instead of separate chairs cut from short pieces of angle bars, I employ a single angle bar 57 and notch out one web of the bar as at 58 and 59, to provide a plurality of upstanding teeth or supports 61 which are shaped to fit into the angle formed by the sides of the angle bars 64. By employing this means of support, I can prefabricate a screen in sections composed of any number of screen bars 64 and assemble them in a screening apparatus much quicker than where the bars are assembled in the apparatus singly. Also, this form of support is particularly adapted for supporting the screens shown in Figs. 6, 7 and 8 wherein the bars forming the screen require support intermediate their ends. Such supports being clear of the openings between the bars, provide for the uninterrupted movement of cotton over the screen which is a very important feature of my invention.

In Fig. 10, I show the fragments 62 and 63 of two rotary elements of a cleaner, which cooperate with screens 64 and 66, made in accordance with my invention and supported as in Fig. 9 by multiple chairs 67 and 68. The rotary elements 62 and 63 rotate in the directions indicated by the arrows so that cotton is delivered from the screen 64 to the screen 66. In order that this may be done without waste and without clogging, I extend the bars forming the screen 64 over the ends of the bars forming the screen 66, as shown at 69, whereby the cotton is delivered over the ends of the bars at 69 onto the screen 66. With any of the modifications of my improved invention shown and described, it will be appreciated that I provide a construction wherein the cotton is moved over the screen and is effectively cleaned without danger of clogging, due to the continuous elongated openings through the screen, and the free discharge of cotton from the ends of the screen bars.

In Fig. 11 I show in plan a fragment of a screen embodying still another form of my invention in which the angle bars 70 forming the screen having their sides tapered so as to provide gradually widening openings 71 toward the delivery end 72 of the screen. Such an arrangement provides means whereby larger particles such as burrs which sometimes may lodge between the sides of the screen bars may be carried along until they come to a portion of the screen where the opening is wide enough for them to pass through. Such a screen may be composed of straight angle bars mounted as hereinbefore shown and the screen operated in any manner known to the art. Also, as is well understood, the bars 70 may be curved as shown in any of the preceding modifications.

With any form of my invention, cotton is fed on to one end of the screen and is agitated and propelled by any suitable means such as mechanically, pneumatically or by gravity, over the screen, preferably in the direction longitudinally of the screen bars though not necessarily limited thereto. In its uninterrupted travel over and along the screen bars, leaves and sticks are engaged by the sharp edges of the bars and move down the sloping sides to be discharged through the openings. Relatively long sticks and stems in their travel over the screen assume a position parallel to the bars and fall through the openings.

From the foregoing, it will be apparent that I have devised an improved cotton cleaner screen, which is particularly adapted for the separation of green leaves and sticks from the cotton as it comes from the field. It will also be seen that any cotton, leaves, sticks, stems, or other trash which is forced into or partially through the slots between the ribs will be caused to pass on through the openings between the bars and that any cotton which may partially protrude through the slots between the ribs will have a clear discharge through the delivery opening. There is thus provided a self cleaning screen which is not subject to clogging.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are specifically set forth in the appended claim.

What I claim is:

In a cotton cleaner embodying a rotary cleaning drum, a plurality of parallel angle bars curved to form an arcuate cotton supporting screen along which bars the cotton is adapted to be moved by said drum, the ridges of the angle bars forming the concave surface of the screen, said bars having their adjacent edges spaced to permit the passage of trash therebetween, but close enough to retain substantially all the cotton, and relatively narrow supporting means for the angle bars secured thereto in the angle between the sides of the bars.

THADDEUS S. GRIMES.

REFERENCES CITED

The following references are of record in the file of this patent:

UNITED STATES PATENTS

| Number | Name | Date |
|---|---|---|
| 33,618 | Watson | Oct. 29, 1861 |
| 176,908 | Webb | May 2, 1876 |
| 574,201 | Jenkins | Dec. 29, 1896 |
| 760,590 | Vodra | May 24, 1904 |
| 888,000 | Conner | May 19, 1908 |
| 1,059,270 | Brown | Apr. 15, 1913 |
| 1,611,036 | Hovda | Dec. 14, 1926 |
| 1,915,920 | Campbell | June 27, 1933 |
| 2,160,253 | Rylander | May 30, 1939 |
| 2,316,590 | Johnson | Apr. 13, 1943 |

FOREIGN PATENTS

| Number | Country | Date |
|---|---|---|
| 1,556 | Great Britain | 1861 |
| 422,771 | Great Britain | Jan. 17, 1935 |
| 592,573 | France | Aug. 5, 1925 |